United States Patent
Smith et al.

(10) Patent No.: US 9,326,538 B2
(45) Date of Patent: *May 3, 2016

(54) INTERMEDIATE MOISTURE BAR USING A DAIRY-BASED BINDER

(75) Inventors: Gary Francis Smith, Glenview, IL (US); Olaf C. Kortum, Neubiberg (DE); Yinqing Ma, Bethesda, MD (US); Amanda J. Reilly, Chicago, IL (US); Kelly K. Harman, Chicago, IL (US); Edward Charles Coleman, New Fairfield, CT (US); Juan R. Peebles, Chicago, IL (US)

(73) Assignee: Kraft Foods Group Brands LLC, Chicago, IL (US)

(*) Notice: Subject to any disclaimer, the term of this patent is extended or adjusted under 35 U.S.C. 154(b) by 247 days.

This patent is subject to a terminal disclaimer.

(21) Appl. No.: 12/755,828

(22) Filed: Apr. 7, 2010

(65) Prior Publication Data

US 2011/0250327 A1    Oct. 13, 2011

(51) Int. Cl.
  *A23L 1/164*    (2006.01)
  *A23C 13/12*    (2006.01)
  *A23C 19/076*    (2006.01)
  *A23C 19/09*    (2006.01)

(52) U.S. Cl.
  CPC .............. *A23L 1/1643* (2013.01); *A23C 13/12* (2013.01); *A23C 19/0765* (2013.01); *A23C 19/09* (2013.01); *A23V 2002/00* (2013.01)

(58) Field of Classification Search
  USPC .......................................... 426/618, 619, 620
  See application file for complete search history.

(56) References Cited

U.S. PATENT DOCUMENTS

| | | |
|---|---|---|
| 2,319,562 A | 5/1943 | Sharp |
| 2,693,419 A | 11/1954 | Gager |
| 3,431,112 A | 3/1969 | Durst |
| 3,903,308 A | 9/1975 | Ode |
| 3,981,739 A | 9/1976 | Dmitrovsky et al. |
| 4,055,669 A | 10/1977 | Kelly et al. |
| 4,083,733 A | 4/1978 | Asano et al. |
| 4,298,625 A | 11/1981 | Cillario |
| 4,478,855 A | 10/1984 | Dahlen et al. |
| 4,497,834 A | 2/1985 | Barta |
| 4,568,557 A | 2/1986 | Becker et al. |
| 4,594,110 A | 6/1986 | Kussendrager et al. |
| 4,673,578 A | 6/1987 | Becker et al. |
| 4,689,238 A | 8/1987 | Hitchner |
| 4,759,940 A | 7/1988 | Cattaneo et al. |
| 4,871,557 A | 10/1989 | Linscott |
| 4,871,573 A | 10/1989 | Bohren et al. |
| 4,955,363 A | 9/1990 | Harju et al. |
| 5,091,201 A | 2/1992 | Murata et al. |
| 5,275,830 A | 1/1994 | Smith |
| 5,397,589 A | 3/1995 | Korte et al. |
| 5,413,805 A | 5/1995 | Delpierre, III et al. |
| 5,520,946 A | 5/1996 | Chablaix et al. |
| 5,612,074 A | 3/1997 | Leach |
| 5,759,612 A | 6/1998 | van Dalsem et al. |
| 5,786,008 A | 7/1998 | Humphry et al. |
| 6,033,696 A | 3/2000 | Aebischer et al. |
| 6,103,283 A | 8/2000 | Zukerman et al. |
| 6,548,099 B1 | 4/2003 | Baker et al. |
| 6,592,915 B1 | 7/2003 | Froseth et al. |
| 6,607,760 B2 | 8/2003 | Burri et al. |
| 6,667,068 B2 | 12/2003 | Smith |
| 6,773,734 B2 | 8/2004 | Sirohi et al. |
| 6,830,768 B2 | 12/2004 | Neidlinger et al. |
| 6,863,909 B2 | 3/2005 | Baensch et al. |
| 6,875,449 B1 | 4/2005 | Marriott et al. |
| 7,097,870 B2 | 8/2006 | Funk et al. |
| 7,118,774 B2 | 10/2006 | Coleman et al. |
| 7,198,812 B2 | 4/2007 | Forte et al. |
| 7,220,442 B2 | 5/2007 | Gautam et al. |
| 7,235,276 B2 | 6/2007 | Allen et al. |
| 7,351,439 B2 | 4/2008 | Zukerman et al. |
| 2002/0039608 A1 | 4/2002 | Sirohi et al. |
| 2003/0091697 A1 | 5/2003 | Froseth et al. |
| 2003/0196957 A1 | 10/2003 | Henningfield et al. |
| 2004/0005400 A1 | 1/2004 | Zukerman et al. |
| 2004/0185149 A1 | 9/2004 | Prosise et al. |
| 2004/0208967 A1 | 10/2004 | Getler |
| 2004/0241313 A1 | 12/2004 | Nana et al. |
| 2005/0002989 A1 | 1/2005 | Palmer et al. |

(Continued)

FOREIGN PATENT DOCUMENTS

| | | |
|---|---|---|
| EP | 0 113 940 A1 | 7/1984 |
| EP | 0 178 074 A1 | 4/1986 |
| EP | 0 340 857 B1 | 3/1993 |
| EP | 0 938 848 A1 | 9/1999 |
| EP | 1151676 A1 | 7/2001 |
| EP | 1 166 647 A2 | 1/2002 |
| JP | 02-276547 A | 11/1990 |
| JP | 08-112062 A | 5/1996 |
| JP | 08112062 | 7/1996 |
| WO | 99/11147 A1 | 3/1999 |
| WO | 00/56171 A1 | 9/2000 |
| WO | 0056174 A1 | 9/2000 |

OTHER PUBLICATIONS

European Patent Office Extended European Search Report for European Application No. 111613261.1 dated Jul. 15, 2011 (5 pages).

*Primary Examiner* — Lien T Tran
(74) *Attorney, Agent, or Firm* — Fitch, Even, Tabin & Flannery LLP

(57) ABSTRACT

A chewy and intermediate moisture bar is provided that uses a dairy-based binder generally without the need to employ gums, humectants, and sugar syrups as a binder to achieve the moist and chewy texture. In one aspect, the bar includes a dry base uniformly blended with a dairy-based binder that uses high levels of dairy proteins as the main binding component. A method of forming the chewy and intermediate moisture bar is also provided that may use a lay or delay period to allow moisture equilibration or migration from the binder to the dry base.

10 Claims, No Drawings

(56) References Cited

U.S. PATENT DOCUMENTS

| | | |
|---|---|---|
| 2005/0181019 A1 | 8/2005 | Palmer et al. |
| 2005/0226960 A1 | 10/2005 | Boice et al. |
| 2006/0115553 A1 | 6/2006 | Gautam et al. |
| 2006/0115554 A1 | 6/2006 | Gautam et al. |
| 2006/0128953 A1 | 6/2006 | Shi et al. |
| 2007/0231450 A1 | 10/2007 | Coleman et al. |
| 2007/0286937 A1 | 12/2007 | Baechler et al. |
| 2008/0020098 A1 | 1/2008 | Gautam et al. |
| 2009/0081308 A1 | 3/2009 | Kussendrager et al. |
| 2009/0263557 A9 | 10/2009 | Venneri |

INTERMEDIATE MOISTURE BAR USING A DAIRY-BASED BINDER

FIELD

The field relates to snack and cereal bars and, in particular, to snack and cereal bars having dairy components as a binder to form a moist, creamy, and chewy bar.

BACKGROUND

Snack and cereal bars are becoming more popular with consumers for their ease in providing a convenient and ready-to-eat product. Common snack and cereal bars typically tend to be either crunchy or chewy. The crunchy bars generally have a low water activity less than about 0.5 and, in some cases, around 0.2 to about 0.3. Chewy bars generally have a higher water activity typically greater than about 0.5 and, in many cases, between about 0.5 to about 0.65. Such chewy bars can, in some instances, be more desired because they resemble the texture and mouthfeel of candy bars. To achieve this chewy texture, such bars may use high levels of a binder component relative to the other bar ingredients, where the binder component helps provide a moist and chewy texture while at the same time holds the various bar ingredients, such as granola, grains, fruit, nuts and the like together in a cohesive bar shape. The binder component acts as a glue to retain the bar in the desired shape. To achieve the chewy texture, however, many prior snack and cereal bars, similar to many candy bars, use relatively high amounts of sugar syrups, humectants, gums, glycerin, and/or other sugar based binding ingredients as one of the main components of the binder. The sugar syrups, such as corn syrup, isomalt, maltitol, maltose syrups, and the like, can be useful for forming a moist and chewy bar due to a humectant effect of these syrups, which tends to retain moisture in the bar. However, such sugar syrups, gums, humectants, and/or glycerin are generally less desired in foods for a number of reasons.

Without such binder ingredients in a bar to provide the humectant effect, simply increasing the moisture level or water content of the binder in order to increase the bar's chewiness or moistness can render manufacturing of the snack or cereal bar difficult on conventional bar processing equipment. Moreover, high moisture binders without these traditional binding ingredients may completely fail to form a self-supporting bar because the binder cannot retain the bar in a desired shape. Conventional bar making equipment commonly includes compression rollers to sheet out a slab of dough, slitting knives to cut the sheeted dough into a desired width, and guillotine blades to cut the slit dough into a desired length. By increasing the moisture level of a binder without the use of syrups, gums, humectants, or other sugar based binders, the higher moisture binder often cannot effectively retain a sufficiently firm slab for processing on such equipment. In other instances, the increased moisture dough may be too sticky on its outer surfaces, which may cause problems when the bar is processed through the compression rollers, slitter knives, and guillotine blades because the bar dough may ball-up or pick-off onto the equipment.

Attempts have also been made to employ alternative binders, such as dairy-based binding components, but prior dairy-based binders have shortcomings that render the dairy binders less than desirable for a number of reasons. For example, prior snack bars with dairy-based binders generally have a lower moisture level resulting in a crispy texture, employ humectants or sugar syrups to maintain higher moisture levels, add gums to achieve sufficient binding capacity, and/or require high processing temperatures to functionalize the dairy proteins into an effective binder component. These all tend to be shortcomings of a dairy-based binder. As mentioned above, crispy bars generally do not provide the mouth-feel and eating satisfaction that chewy bars can provide. While high levels of humectants, sugar syrups, and/or gums may be effective in forming a self-supporting, chewy bar with dairy-based binders, as discussed above, these ingredients are generally less desired in foods. High processing temperatures, which are believed to be needed to functionalize a dairy ingredient into an effective binder, can have negative organoleptic effects on the dairy components resulting in undesired organoleptic changes such as a cooked flavor, burnt notes, agglomeration, and/or a gritty texture of the finished bar. Cooked or burnt flavor notes takes away from the fresh dairy impression upon eating.

When using large amounts of a dairy source as a binder, it is generally believed that heating or cooking the dairy ingredients at temperatures of at least about 70° C. (158° F.) or higher may be needed in order to functionalize the dairy proteins as a binder component. While not wishing to be limited by theory, it is generally believed that heating dairy proteins helps solublize or disperse casein proteins into an aqueous phase, which then results in an increase in viscosity of the binder and a much firmer bar. It is generally believed that the solublized dairy proteins can more easily mix with various additives and form bonds on a molecular level to help bind various materials together.

However, as mentioned above, heating at such high temperatures needed to functionalize the dairy is generally undesired. For example, heating a dairy-based binder to about 70° C. (158° F.) or above generally causes the lactose in the dairy binder to be solubilized. Upon cooling of the bar, it is believed that the lactose may solidify into crystals that can form into relatively large agglomerates upon cooling. Such large crystals or agglomerates may result in a gritty mouthfeel or a bar that does not have texturally smooth or creamy characteristics.

Prior cereal bars employing a dairy-based binder also incorporated gums, humectants, hydrocolloids, glycerin, and sugar syrups in order to achieve a chewy or creamy mouthfeel. Use of large amounts of these ingredients is also generally undesired. These ingredients can be high in sugar and calories and/or impart undesired sweetness and other unwanted organoleptic characteristics to the bar.

Also, exposing dairy ingredients to high temperatures above about 70° C. (158° F.) also may result in an off-white color to the dairy components due to discoloration of the dairy components in the binder due to the heating. For example, dairy proteins typically undergo browning reactions upon exposure to elevated temperatures. Heating dairy proteins may result in color changes and/or gelation during processing or extended storage. It is believed that the lactose in milk, which has been heated to high temperatures, tends to interact with proteins and results in an unsightly brown color. This undesired condition is often referred to as "browning" or a "browning reaction." Both gelation and browning are undesirable in milk and products using dairy proteins since they impart objectionable organoleptic properties and negatively affect the creamy and white color desired in food bars employing dairy components

SUMMARY

A chewy and intermediate moisture bar is provided that uses a dairy-based binder generally without the need to employ gums, humectants, and sugar syrups as a binder to achieve the moist and chewy texture. In one aspect, the bar includes a dry base uniformly blended with a dairy-based binder, which uses high levels of dairy proteins (such as casein) as the main binding component rather than significant amounts of gums, humectants, and sugar syrups. By one approach, the dry base may be selected from grains, nuts, granola, oats, and the like as well as mixtures thereof. By one approach, the dairy-based binder generally includes about 3 to about 14 percent dairy protein such as casein, and about 16 to about 35 percent water. Preferably, the binder includes less than about 0.1 percent non-dairy binding ingredients such as gums, sugar syrups, humectants and the like. Even without the traditional binding ingredients of gums, sugar syrups, and humectants, the dairy-based binder effectively functions as a binding component even with higher moisture levels and intermediate water activities. To this end, the dairy-based binder functions as an effective binder, by one approach, by employing a dairy protein to moisture ratio of less than about 0.5 such that the dairy-based binder includes about 2 to about 5 times as much moisture as dairy protein. This ratio is effective in hydrating the dairy protein, but also forming a binder sufficient to form a self-supporting bar shape.

Not only does the binder have high levels of dairy proteins, but the final bar also includes a high level of dairy proteins. By one approach, the final bar includes about 3 to about 9 percent total dairy protein such as casein and about 10 to about 40 percent total water to form a chewy and moist bar that exhibits fresh dairy notes. The final bar also has a total dairy protein to total moisture ratio of less than 0.5 such that the bar includes about 2 to about 5 times as much total moisture as total dairy protein so that the dairy protein is sufficiently hydrated effective to function as a binder to form the dry base into a moist and chewy self-supporting bar shape at room temperature. Thus, by one approach, both the dairy based binder and the final bar have substantially the same ranges of dairy protein to moisture levels and, preferably, substantially the same dairy protein to moisture levels, which has been discovered as being effective to functionalize the dairy components into a binder when not using substantial amounts of gums, humectants, and sugar syrups. Such composition provides a unique bar texture and eating experience that has not been provided previously.

In addition to the effective ratios of moisture and dairy proteins discussed above, the dairy-based binder and the assembled bar all have carefully controlled temperature exposures during processing. For example and by one approach, a maximum temperature exposure of the dairy-based binder and assembled bar is about 68° C. (155° F.) or lower, and in other approaches, about 43° C. (110° F.) or lower. The careful control of maximum temperature exposure combined with the ratios of dairy protein and moisture provides for a bar with less firmness and greater creaminess than a bar with a higher heat treated binder. The bars herein provide sufficient protein to hold the bar together, but at the same time provide for a unique creamy texture that is easy to bite through and chew.

In another aspect, a method of forming a chewy and intermediate moisture bar using dairy-based binder ingredients is provided. By one approach, the method prepares a dairy-based binder by blending dairy protein with water at a temperature of about 68° C. (155° F.) or lower so that the dairy-based binder has a dairy protein to water ratio of about 0.5 or less with about 2 to about 5 times as much water as dairy protein. The dairy-based binder is then combined with a dry base selected from grains, nuts, granola, oats, and the like as well as mixtures thereof to form an intermediate blend wherein both the dry base and the intermediate blend are exposed to a maximum temperature of about 68° C. (155° F.) or lower.

After blending, the intermediate blend is then optionally held for about 15 minutes to about 6 hours at about 54° C. (130° F.) or lower to substantially maintain the intermediate blend's moisture level and to hydrate the dry base using water in the dairy-based binder such that a total moisture level of the intermediate blend after the holding period is within about 5 percent to about 1 percent of a total moisture level of the intermediate blend prior to the holding period. That is, the intermediate blend neither gains nor loses a substantial amount of water during the holding period. After this holding period, the intermediate blend with the retained moisture is then assembled into the chewy and intermediate moisture bar at temperatures of about 68° C. (155° F.) or lower so that the final bar has a total dairy protein to total water ratio of about 0.5 or less with about 2 to about 5 times as much water than dairy protein to form a self-supporting bar at room temperature.

DETAILED DESCRIPTION

A moist and chewy ready-to-eat snack or cereal bar is provided. In one aspect, the ready-to-eat snack or cereal bars include a dairy-based binder component and a dry base. The dairy-based binder component employs a particular combination of dairy proteins relative to a moisture level to functionalize the dairy proteins as a binder. The dairy-based binder and combination of dairy protein relative to moisture is effective to form a self-supporting bar without the need to use significant amounts of non-dairy binders such as sugar syrups, gums, humectants, and the like. With the dairy protein and moisture levels used in the dairy-based binder component, it not only renders the snack bar nutritious, but exhibits a moist, chewy, and creamy texture in a self-supporting form even without the syrups, gums, and humectants of the prior bars. Instead of relying on syrups, gums, and humectants as a binder component, it has been discovered, in one approach, that the particular ratios of the dairy protein to moisture in both the binder and the final bar are effective to functionalize the dairy proteins into a binder sufficient to form a self-supporting bar.

In another aspect, it also has been discovered that particular dairy processing conditions combined with the dairy protein and moisture levels may be effective to facilitate the formation of the moist and creamy bar when employing such high levels of dairy-based binding components and moisture in a binder without the use of syrups, gums, and humectants. In this aspect, with the high dairy and moisture levels in the binder formula, it is preferred that the binder as well as the assembled bar itself are not exposed to temperatures above about 68° C. (155° F.) and, in some cases, not above about 43° C. (110° F.) during any processing step. While not wishing to be limited by theory, it is believed that by not exposing the dairy-based binder components to temperatures above about 68° C. (155° F.), hydration and/or dissolving the lactose is generally avoided at the concentrations of the formulas herein, which may limit the formation of agglomerates or large crystals of lactose upon cooling; thus, resulting in a smoother and creamier texture. In addition, maintaining the temperature exposure of the bar and bar ingredients below about 68° C. (155° F.) tends to reduce and, preferably, eliminate any protein denaturation and also reduces and, preferably, avoids the formation of cooked or burnt notes. Rather than heating the dairy components to functionalize them as a binder, as done in prior bars, the dairy-based binders herein use the unique combination of dairy protein levels relative to certain moisture levels so that effective dairy protein to moisture ratios are achieved to sufficiently hydrate the dairy proteins to functionalize them as a binder without the need for high processing temperatures.

With such increased dairy and moisture levels in the binder, the desired chewy and creamy texture may also be achieved, in yet another approach, by employing a dough rest or lay period during processing in which the dough is maintained, in one approach, in a relatively large mass with relatively little surface area effective to allow hydration of the binder and other components. This rest or lay period is a significant delay time between blending of the bar and binder components and a subsequent processing into a bar shape. It is believed that this lay period is effective to allow a portion of the moisture in binder components to hydrate not only the dairy proteins such as casein proteins, but it is also believed the lay period allows the moisture to equilibrate with any remaining components of the bar, such as the dry base components. Thus, with this approach, the higher moisture used in the binder is equilibrated between the hydration of the dairy proteins and remainder of the bar. The lay period enables the formed dough to be processed on conventional bar forming technologies. Without the lay period, the dough is generally too wet and sticky to be easily processed on conventional bar forming equipment. Thus, the snack bars herein may employ unique combinations of dairy-based binders, dairy or casein protein levels, moisture, and/or processing conditions to form moist and chewy bars without the use of significant amounts of sugar syrup, gums, and humectants as commonly used in prior art bars.

Turning to more of the specifics, the snack and cereal bars provided herein include relatively high amounts of a dairy-based binder component and, thus, high amounts of dairy proteins, such as casein proteins relative to the dry base. By one approach, for example, the final snack bar has at least about 40 percent and, preferably, about 50 to about 60 percent of the dairy-based binder component. In this approach, the dairy-based binder component includes particular amounts of dairy or casein proteins relative to increased moisture levels to ensure that it can effectively function as a binder without heating and without the use of significant amounts of sugar syrups, gums, and humectants.

As used herein, significant amounts of sugar syrups, gums, and/or humectants, which may be referred to herein as non-dairy binding ingredients, generally means less than about 0.1 percent, preferably, less than about 0.01 percent, and most preferably, no sugar syrups, gums, and/or humectants. As used herein, humectants include, but are not limited to, glycerin, sorbitol, mannitol, propylene glycol, butylene glycol, maltitol, and the like; gums include, but are not limited to, carrageenan, guar gum, locust bean, gum Arabic, xanthan, pectin, gelatin, carboxymethylcellulose, and the like; and sugar syrups include, but are not limited to, corn syrup, isomalt, maltitol, maltose syrups, and the like.

By one approach, the dairy-based binder component includes about 65 to about 75 percent solids, about 3 to about 14 percent dairy protein (preferably, about 8 to about 14 percent) that is predominately casein protein, about 12 to about 20 percent lactose, about 6 to about 25 percent fat, and about 16 to about 35 percent water (preferably, about 25 to about 35 percent water). The binder also preferably has less than about 40 percent non-dairy sugars and, preferably about 8 to about 16 percent non-dairy sugars. Even with a binder with such levels of protein, lactose, and water without the traditional non-dairy binding components of sugar syrups, gums, and humectants, the dairy-based binder component is still effective to form a self-supporting bar by maintaining effective ratios of dairy protein to moisture in both the binder component and the final bar.

In one embodiment, the binder, as well as the final bar, have a ratio of dairy protein to moisture less than about 0.5, preferably, about 0.2 to about 0.5 and, most preferably, about 0.3 to about 0.5 so that the binder has about 2 to about 5 times (preferably about 2 to about 3 times) more water than dairy protein. Such ratios are effective to hydrate the high levels of dairy proteins into a form that can function as a binder even when maintaining the binder and bar at temperatures below about 68° C. (155° F.) and, in some cases, below about 43° C. (110° F.). Dairy and moisture levels outside these ranges when using temperatures below about 68° C. (155° F.) either are too runny to function as a binder or too thick to form a creamy bar.

In one form, the protein in the dairy-based binder component may be obtained from aqueous dairy components, dry dairy components, and blends thereof. For example, the aqueous dairy component may be liquid dairy sources, moist or semi-solid dairy sources, and mixtures thereof. The dry dairy component may be obtained from various dairy powders having little or no moisture (i.e., generally less than about 5 percent moisture). For example, the dairy-based binder can be formed from blends of water and dairy ingredients from one or more of the aqueous and/or dry dairy sources in amounts to achieve the desired levels of moisture, solids, protein, and lactose described above.

By one approach, suitable aqueous dairy components for the binder include milk (such as skim, reduced fat, 2 percent, whole) cream, condensed milk, sweetened condensed milk, condensed fat-free milk, sweetened condensed fat-free milk, ultrafiltered milk, ultrafiltered condensed milk, yogurt, other cultured dairy products, and the like. Suitable solid or semi-solid dairy ingredients include yogurts, other cultured dairy products, dairy pastes, cheeses (such as cream cheese, cottage cheese, ricotta, Cheddar, Neufchatel, processed, and the like) and the like. Suitable powdered dairy ingredients include milk powders, cultured powders, non-fat dry milk powders, skim milk powders, milk protein concentrate powders, whey protein concentrate powders, and the like.

Preferably, the ratio of dairy protein to moisture forms a binder component that has a paste-like composition, but at the same time sufficient moisture relative to the dairy proteins effective so that the dairy proteins can adequately hydrate without heating to functionalize the mass as an effective binder. In one approach, the binder has an intermediate water activity of about 0.5 to about 0.9, in another approach, about 0.7 to about 0.9, and yet another approach about 0.7 to about 0.85. For example, a dairy-based binder component may have a total moisture content of about 16 to about 35 percent, and may include blends of about 19 to about 44 percent of an aqueous dairy source (such as milk, cream, or cream cheese) and about 8 to about 37 percent dry dairy source (such as non-fat dry milk powder) with less than about 40 percent non-dairy sugar. As further discussed below, if the water activity and moisture level is higher or lower, the dairy based binder will not function without the use of high heat levels and/or sugar syrups, gums, and humectants.

The dairy-based binder component is blended in a substantially uniform manner with an edible or dry base component. By one approach, the bar includes up to about 60 percent of the edible base component, preferably, about 35 to about 50, and most preferably, about 35 to about 45 percent blended with the dairy-based binder component. By one approach, the edible or dry base component may include grains, granola, oats, nuts, and the like as well as mixtures thereof. In other approaches, the edible or dry base component may also include fruits, cookies, raisins, soy crisps, oatmeal, cereals, cake, cookies, pretzels, pasta, grain based products, starches, rice, wheat, other amylaceous materials, and the like, and mixtures thereof. Optionally, the bar may also be blended with various inlays or other ingredients as desired, such as various intermediate and high moisture fruits, nuts, raisins, candies, flavors, nutrients, and the like. If such inlays are included, it is preferred that snack and cereal bar includes about 5 to about 8 percent of such inlays. If desired, the bar may also be coated or enrobed or have blended therein a coating, such as chocolate, caramel, and the like. Alternatively, the bar may have multiple layers of the binder, edible base component with various fillings, fruit, and/or coatings therebetween.

In another aspect, the final snack and cereal bars have intermediate moisture levels between about 10 and about 40 percent (in another approach, about 10 to about 18 percent), which results in an intermediate water activity of the bar of about 0.5 to about 0.9, in some cases, about 0.7 to about 0.9, and in other cases, about 0.7 to about 0.85. It is believed that such moisture level relative to the dairy protein levels is effective to lower the viscosity of the dairy-based binder helping to functionalize the dairy components (such as casein proteins) into an effective binder without the need for excessive heating, which as mentioned above results in several undesired problems when using significant amounts of dairy components. The resultant bar is moist and creamy, which is tender to chew but does not have a soggy texture. With the dairy-based binder that is assembled into a bar without heating, the bars also exhibit enhanced fresh milk and dairy flavors, exhibit enhanced whiteness, and are generally free of cooked and/or other off-flavors typically found in dairy products when exposed to high temperatures.

Because the dairy-based binder component and assembled bar, in one approach, are not exposed to high temperatures during processing, several optional ingredients not possible in the prior bars can easily be incorporated into the bar. For instance, because the snack or cereal bars herein are not heated above 43° C. (110° F.) in some approaches, the bar may include live and active cultures. In such approach, the live or active cultures may be provided by yogurt, other cultured dairy products, cheese, probiotics, and mixtures thereof. The live and active cultures may be included in either the dairy-based binder component or the dry base component.

The dairy-based snack and cereal bars described herein are generally solid at ambient temperatures (i.e., about 22 to about 25° C.) and have moisture levels in the finished or assembled bar of about 10 to about 40 percent and, in other instances, about 20 to about 40 percent. The bars are moist and chewy, but retain a solid structure, which generally refers to the bar and binder system as being sufficiently firm to be self-supporting at ambient temperatures. By being self-supporting, the bar is capable of being picked up and held in a horizontal position without significant deformation or drooping. By another approach, the firmness of the bar at room temperature may be measured as the penetration of an unaerated bar that is greater than about 150 grams force, preferably about 150 to about 15,000 grams force, and more preferably about 1,000 to about 10,000 grams force. Firmness can be measured using a universal testing machine in the penetration mode (e.g., Texture Technologies TA-XT2 using a 45° conical probe) or similar testing equipment.

The dairy-based binder may also include a number of optional ingredients depending on the particular application. For example, the binder may include emulsifiers, emulsifying salts, stabilizers, bulking agents, preservatives, colorants, vegetable or dairy fats, sweeteners, flavors, edible acids, fruits, nuts, nutrients, vitamins, mineral supplements (e.g., calcium fortification), and starches among other ingredients. For example, optional binder ingredients may include titanium dioxide (for color), potassium sorbate (preservative), maltodextrin (filler), soy lecithin (emulsifier), wheat dextrin (filler), soy fiber (fiber source), anhydrous milk fat (creaminess), salt, starches, and lactic acid. Suitable optional emulsifying salts may include, for example, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pryrophosphate, and the like, as well as mixtures thereof. If used, sodium citrate, disodium phosphate, or mixtures thereof are the preferred optional emulsifying salts. Suitable emulsifiers may also include, for example, monoglycerides, diglycerides, polysorbates, sodium stearoyl lactylate, lecithin, and mixtures thereof as well as the like. If used, monoglycerides, diglycerides, sodium stearoyl lactylate, and mixtures thereof are the preferred optional emulsifiers. Preferably, such emulsifiers may be used in aerated solid milk products. The dairy-based binder may optionally include sweeteners, such as non-lactose sweeteners. The sweeteners may also be artificial sweeteners. For instance, the binder may include sucrose, dextrose, fructose, glucose, maltose, corn syrup, honey, and non-nutritive sweeteners. If used, the preferred sweetener is sucrose. The added sugars or sweeteners can be added separately or via sweetened condensed milk. Preferably, as discussed above, the non-dairy sweetener is less than about 40 percent of the binder, and preferably, about 8 to about 16 percent.

The dairy based binder may also optionally include added edible vegetable and dairy fats. Suitable edible fats include, for example, butter, cream, anhydrous milk fat, vegetable fats, coco butter, and mixtures thereof as well as the like. If used, the edible fat may generally have a melting point less than about 50° C. In other cases, it may be desired to use edible fats with a melting point of about 35 to about 45° C. If used, the edible fat is preferably anhydrous milk fat, and preferably melted prior to incorporation in the binder or binder/base blend.

If desired, these optional ingredients can be incorporated into the binder or bar so long as these additives do not interfere or adversely effect the desired properties (i.e., firmness, water level, processing requirements, and the like). If included, these additives generally constitute less than about 10 percent of the final product (except the sweetener). Such additives can be added either during the initial blending or after essentially all components have been hydrated. Preferably, solid additives may be added during the shear treatment and liquid additives may be added during the initial blending. Of course, in cases where it is desired to maintain the physical integrity of the additives (e.g., fruit, nut, or grain pieces), the addition may generally be completed under low shear conditions.

The dairy-based binder component of the snack and cereal bars may also be aerated. In an aerated product, the overrun of the aerated dairy-based binder component and/or final bar may be about 5 to about 100 percent and, in some cases, about 15 to about 60 percent. Other aeration levels may also be used as appropriate. Aerated dairy based binders preferably contain about 0.05 to about 0.7 percent emulsifier, and more preferably about 0.15 to about 0.4 percent emulsifier. For example, the dairy binder may be aerated using a gas injection such as, for example, air, nitrogen, or carbon dioxide. Other aeration techniques may also be used. Generally, the aerated binder may have a density of less than about 1.14 g/ml as compared to a density of about 1.2 to about 1.3 g/ml for the unaerated product. Aeration can be used to prepare dairy based binders which resemble ice cream, yogurt, and the like.

Turning now to a method of forming the snack and cereal bar. By one approach, the method of forming the dairy-based binder and the final bar carefully controls the maximum temperature exposure of the ingredients. For example, the dairy-based binder components (and in particular the dairy components thereof) as well as the assembled bar occurs at temperatures of about 68° C. (155° F.) or below and, in some cases, about 43° C. (110° F.) or below. That is, the binder, dairy components, and the assembled bar are not exposed to temperatures of about 68° C. (155° F.) or above, and in some cases, not exposed to temperatures above 43° C. (110° F.).

To prepare the binder, the various liquid and dry ingredients are blended. First, the dairy-based binder component is prepared by blending the dairy protein source(s) with water (if needed) within the appropriate ratios as discussed above. The blend is mixed under high and/or low shear conditions until a homogenous paste is obtained. During the mixing and blending, the temperature is maintained at about 68° C. (155° F.) or below and, optionally, about 43° C. (110° F.) or below. After the homogenous paste is obtained, the dry base component may be added or mixed into the paste to form an intermediate blend. During this mixing step, the temperature of the intermediate blend is maintained at about 68° C. (155° F.) or below and, optionally, about 43° C. (110° F.) or below. After these mixing steps, the resultant mixture or intermediate blend may be cooled, such as to below about 40° C. (104° F.) and, in some cases, to below about 10° C. (50° F.) to form a cooled intermediate blend. If desired, the intermediate blend or binder component can be homogenized before cooling.

The intermediate blend may then be formed or assembled into a bar-shape using conventional techniques. By one approach, the bar can be sheeted, layered, or extruded. The bar can be molded or cut into the desired shapes. In other approaches, the intermediate blend can be filled into various containers or formed into solid bars, candy-type bars, cookies, cookies or bars with other ingredients (e.g., granola, grains, peanuts, other nuts, chocolate bits or chips, and the like), bite-sized forms or pieces, enrobed solid forms, shapes (e.g., animal, stars, letters), and the like. The bar can be produced with varying levels of sweetness as needed.

In another approach, the intermediate blend of the dairy-based binder component and dry base component may optionally be subjected to a delay or lay period prior to any further processing (such as bar formation). This delay period is effective to enable moisture migration and moisture equilibration through the dough binder and dry base. By one approach, the binder components and dry base components may be blended together at about 68° C. (155° F.) or below (optionally about 43° C. (110° F.) or below) for a time effective to form a cohesive dough mass (by one approach about 5 to about 10 minutes). The dough mass is then allowed to sit or lay (by one approach, at room temperature (about 20 to about 25° C.) and, in another approach, at temperatures up to about 125 to about 130° F.) for about 15 minutes to about 6 hours and, preferably, about 2 to about 2.5 hours to allow moisture migration to hydrate the dairy proteins, providing increased strength to the binder, and to allow moisture equilibration between the hydrated dairy proteins and the dry base component. Providing for this in-process moisture migration enables a higher moisture bar to be prepared on a variety of process equipment because the binder is strengthened proportionally to the amount of moisture migrated to the dry base.

Preferably, the final bar has a moisture loss of about 5 percent or less (preferably, about 1 percent or less) during formation where the moisture of the binder equilibrates and migrates to the dry base rather than being evaporated or otherwise lost. By one approach, to achieve such moisture migration and equilibration, the intermediate blend may optionally be retained and/or formed into a relatively large dough mass having a larger volume than surface area to promote sufficient dough contact. Such dough mass during the lay period is effective, in one approach, to provide adequate volume and intimate contact of the dough for efficient moisture migration and equilibration. For example and by one approach, the dough mass of the intermediate blend during the lay period may have a volume to surface area ratio of about 1 in$^3$ per in$^2$ (or be held in a container providing such volume to surface area) during this lay period to adequately effect moisture migration. By another approach, the delay or lay period may optionally occur in a substantially sealed environment or substantially sealed container, which effectively minimizes moisture loss from the intermediate dough and/or any moisture uptake from the environment during the lay period. By another approach, the sealed container or environment may optionally also have a relative humidity of about 75 percent or lower to help maintain the moisture level of the dough. By yet another approach, the sealed container may optionally have such relative humidity levels maintained in a relatively small headspace or other area between an exposed surface of the dough and a seal, cover, or other containment of the environment or container. By yet another approach, the dry base component may be optionally sprayed with oil, water, or other aqueous liquid prior to being blended with the dairy-based binder to help facilitate the moisture uptake from the binder.

Preferably, it is desired that after the lay period, the moisture level of the dough is within plus or minus about 1 to about 5 percent of the moisture level of the dough prior to the lay period and, preferably, within plus or minus about 1 percent. In other words, the dough does not lose or gain any significant amounts of moisture. It will be appreciated that the above described processing conditions of the lay period are only exemplary and other conditions, equipment, and processing parameters may also be used as needed to achieve the desired moisture equilibration, migration, and retention during processing.

By employing such a delay or lay period to substantially maintain moisture levels, the finished bar preferably exhibits a total dairy protein and total moisture levels substantially the same as the dairy protein and moisture levels of the dairy-based binder because little to no moisture is lost from the product. That is, the finished bar exhibits a total dairy protein to total moisture level of less than about 0.5 and, preferably, about 0.2 to about 0.5, which is within the same range as the ratios of the dairy-based binder component. Preferably, the total dairy protein to total moisture levels of the final bar are substantially the same as the ratios of the dairy based binder (for example, within about 1 to about 5 percent and, preferably within about 1 percent or less). While not wishing to be limited by theory, it is believed this delay or lay period helps facilitate moisture migration from the binder component to the dry base for ease of processing and formation of an effective binder. Preferably, it is desired that the moisture content of the dough is not significantly affected during this lay period, which is distinct from baking, cooking, and other high temperature processing operations of the prior art dough and bars, which can reduce moisture levels.

Advantages and embodiments of the food and cereal bars described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

A dairy and granola bar was prepared with a dairy-based binder component having about 66 percent solids, about 34 percent moisture, about 8.5 percent dairy fat, and about 13.9 percent dairy protein. The binder has a dairy protein to moisture level of about 0.4. One form of the binder included sodium citrate as an emulsifying salt to modify the texture and mouthfeel of the finished bar. These dairy based binders had the composition of Table 1 below.

TABLE 1

Dairy Based Binder

| Ingredient | Binder 1A, lbs | Binder 1B, lbs |
| --- | --- | --- |
| Cream (42% fat) | 19.3 | 19.3 |
| Water | 22.2 | 22.2 |
| Sugar | 16.0 | 16.0 |
| Non-fat dry milk powder (NFDM) | 37.6 | 37.6 |
| Maltodextrin | 4.8 | 4.3 |
| Sodium Citrate | 0 | 0.5 |

To prepare the binder, the water and cream were first mixed in a Breddo mixer for about 5 minutes at about 7° C. Then, NFDM, maltodextrin, sugar, and optional sodium citrate were then added to the mixer and blended for about 10 minutes after all ingredients were added using low shear until uniform and smooth. The temperature increased during blending from about 10° C. to about 39° C.

Next, the dairy based binder component was then combined with granola, raisins, and flavors at about 39° C. The blend included about 50 percent dairy-based binder component, about 42.5 percent granola, and about 7.5 percent raisin and flavors. The blend was then processed into bars by slabbing the mixture, compressing the slab, cooling to about 10° C., cutting into the bar shape, and packaging.

After about 3 days, the bar formed using Binder 1A and 1B had a water activity of about 0.8 (measured at 25° C.). The bar with Binder 1A formed an acceptable chewy bar that had a soft chew, was less dry, and less crumbly than the bar with Binder 1B. However, the bar with Binder 1B was also acceptable with a slightly firmer bite and chew.

Example 2

Another dairy and granola bar was prepared using small amounts of an optional stabilizer to modify the binder texture to create differences in eating quality. In this Example, the dairy based binder was about 70 percent solids, about 30 percent moisture, about 8.5 percent fat, and about 13.9 percent dairy protein. The binder had a dairy protein to moisture level of about 0.46. The binder has the composition of Table 2 below.

TABLE 2

Dairy-Based Binder

| Ingredients | Amount, lbs |
| --- | --- |
| Cream (42% fat) | 19.6 |
| Water | 17.6 |
| Sugar | 16.0 |
| Sodium Citrate | 0.5 |
| NFDM | 37.7 |
| Maltodextrin | 8.5 |
| Fat mimetic (sodium alginate) | 0.08 |

To prepare the binder, an alginate slurry was first prepared by mixing 1 pound of sugar, 3.5 pounds of water, and the alginate (Sodium Alginate, 1000-1500 cps, Kimitsu Algin LZ-2) at 12° C. for about 10 minutes. The sugar was used to disperse the alginate. Next, water and cream were blended in a Breddo mixer for about 5 minutes at about 7° C. Then, the NFDM, maltodextrin, remaining sugar, and the pre-hydrated alginate slurry were added to the mixer and blended for about 10 minutes after all additions until uniform and smooth. The temperature increased from about 10° C. to about 39° C.

The formed dairy based binder was then assembled with granola, raisins, flavors at about 39° C. The composition included about 50 percent dairy binder, about 42.5 percent granola, and about 7.5 percent raisins and flavor. The mass was then assembled into bars using the same procedure of Example 1. After about 3 days, the finished bar had a water activity of about 0.75 (measured at 25° C.) and a moisture content of about 16.6 percent. The bar formed an acceptable chewy texture and was less sticky than the same bar without sodium alginate.

Example 3

A cream cheese based dairy binder was prepared and assembled into a bar. The binder has the composition of Table 3 below.

TABLE 3

Cream Cheese Based Binder

| Ingredient | % |
| --- | --- |
| Cream cheese (58% moisture, 29% fat) | 43.9 |
| Maltodextrin | 8.8 |
| Sucrose | 8.3 |
| Sodium Chloride | 0.3 |
| Skim milk powder | 8.8 |
| Wheat dextrin | 17.6 |
| Potassium sorbate | 0.2 |
| Flavor | 0.8 |
| Titanium dioxide | 0.2 |
| Lactic acid | 0.7 |
| Small granular native rice starch | 10.5 |

To prepare the binder, the cream cheese is first blended in a Breddo mixer under high shear with the maltodextrin and sucrose for about 5 minutes, with the temperature increasing to about 15° C. Then the sodium chloride, milk powder, wheat dextrin, potassium sorbate, flavors, titanium dioxide and lactic acid were added. When sufficiently blended, the rice starch was added and blended under high shear. All of the mixing was conducted without adding heat, the temperature eventually reached about 43° C. The result is a liquid and pumpable paste.

Separately, about 73.5 parts baked oat granola is blended with about 26.2 parts whole oat flakes (previously sprayed with about 15 percent water on top and baked for 6 minutes at about 390° F. and then cooled to room temperature), about 0.26 parts fruit or other flavor. Then about 56.9 percent of the cream cheese dairy binder was blended with about 38.1 percent of the granola/cereal blend and about 5 percent intermediate moisture fruit (Aw of about 0.85) using low shear until uniformly mixed and coated. The mixture was allowed to rest at room temperature (i.e. about 75° F.) for about 3 hours.

The mixture was then pressed into molds and released from the molds. The product attained its final firmness after about 4 days. The water activity of the finished bar was about 0.85. The bar had a pH of about 5.0.

Example 4

Three separate high-moistness bars with a water activity between about 0.7 and about 0.8 that contained at least about 50 percent binder were prepared. A binder having the ingredients of Table 4 below was used for each of the bars. This example compared the results of using the lay time during processing. The binder of Table 4 had about 74 percent solids, about 26 percent moisture, about 20 percent fat, and about 9 percent protein. This binder had a dairy protein to moisture ratio of about 0.35.

TABLE 4

| Binder | | |
|---|---|---|
| Ingredients | Quantity, Lbs | Percentage |
| Cream (42% fat) | 77.5 | 31.6 |
| Sugar | 37.5 | 15.3 |
| NFDM (high heat) | 53.2 | 21.7 |
| Maltodextrin | 25.9 | 10.6 |
| Water | 18.4 | 7.5 |
| Soy lecithin | 2.5 | 1.0 |
| Soy Fiber | 2.5 | 1.0 |
| Frutalose | 12.5 | 5.1 |
| Anhydrous Milk Fat | 15.0 | 6.1 |
| Total | 245 | 100 |

To prepare the dairy based binder, the anhydrous milk fat (AMF) was first warmed to about 125° F. and then mixed with the water and cream in a Breddo mixer at about 125 to about 130° F. Then, the remainder of the dry ingredients were dry blended and then added to the liquid mixture. The liquid soy lecithin was added last. After mixing, the dairy based binder was uniform and smooth. The dairy based binder was used to prepare three separate cereal bars: 4A, 4B, and 4-Control. The comparative results of these bars are provided below in Table 5.

For the 4-Control bar, the dairy-based binder was blended with granola and strawberry pieces for about 5 minutes blending time to form a dough made up of about 50 percent dairy based binder, about 42.5 percent granola, and about 7.5 percent strawberry pieces. The mixture was immediately (within less than about 5 minutes) processed into bars using conventional bar making equipment by first sheeting the dough, compressing the sheeted dough, using a cooling tunnel, slitting to a desired width, and guillotine cutting to a desired length.

For Inventive Bar 4A, the dairy-based binder was blended with the same granola and strawberry pieces for about 5 minutes of blending time to form a dough made up of about 50 percent dairy based binder, about 42.5 percent granola, and about 7.5 percent strawberry pieces. After blending, the dough mixture was allowed to lay or equilibrate in a 5 gallon pail at about 125° F. for about 2.5 hours before further processing. Minimal moisture was lost during this lay period (estimated at about 5 percent or less). After the lay time, the dough was processed into Bar 4A using the same conventional bar making equipment as the control.

For inventive Bar 4B, the dairy-based binder was blended with the same granola and strawberry pieces for about 5 minutes of blending time to form a dough made up of about 55 percent dairy-based binder, about 37.5 percent granola, and about 7.5 percent strawberry pieces. After blending, the dough was very wet. The wet dough was allowed to lay or equilibrate in a 5 gallon pail at about 125° F. for about 2.5 hours before further processing. Minimal moisture was lost during this lay period (estimated at about 5 percent or less). After the lay time, the dough was processed into Bar 4B using the same conventional bar making equipment as the control.

TABLE 5

| | Results | | |
|---|---|---|---|
| Parameter | 4-Control | Bar 4A | Bar 4B |
| % Binder | 50 | 50 | 55 |
| % Moisture | 12.4 | 12.4 | 13.7 |
| % Dairy Protein | 3.7 | 3.7 | 4.1 |
| % Dairy fat | 9.7 | 9.7 | 10.6 |
| Lay time | None | 2.5 hours at 125° F. | 2.5 Hours at 125° F. |
| Observations During Sheeting and Compression | Loose mixture, significant binder loss | More cohesive mass, less wet, less binder loss at sheeting and compression roller | More cohesive mass, less free binder |
| Observations after cooling tunnel | Dry on top but sticky on bottom of the bar, soft | Significantly less sticky than the control bar on both top and the bottom. Bars were firmer than control and were firm enough to be picked up without deformation | Bars were firm enough to be picked up without significant deformation |
| Tasting within about 1 Month | Soft, moist, chewy | Soft, more moist than control, more cohesive chew | Very Moist |
| Tasting within about 4 Months | Soft, chewy, some dry particles | Softer than control, more cohesive chew than control, more uniform texture than control | Very soft and moist, uniform chew, least mouth drying |

As compared to the control, the lay time made the bar surface less sticky and increased bar strength per the horizontal hold test during processing. The finished bars 4A were more moist and cohesive in texture than the control even though the formula was identical to the control. When the binder was increased to about 55 percent of the finished bar, without the lay time, the bars could not be processed using conventional bar equipment. After the about 2.5 hours of lay time, the 4B bars were successfully produced using conventional equipment.

Example 5

A dairy-based bar was prepared using Philadelphia-brand cream cheese (Kraft Foods, Northfield, Ill.) The dairy-based binder was the formula of Table 6 below.

TABLE 6

| Binder | |
|---|---|
| Ingredient | % |
| Cream Cheese (29% fat, 42% dry-matter) | 43.9 |
| Maltodextrin (Avebe Paselli WFR, Avebe America, Princeton, N.J) | 8.7 |
| Sugar | 8.2 |
| salt | 0.3 |
| Skim Milk Powder | 8.7 |
| wheat dextrin | 17.6 |
| Potassium sorbate | 0.2 |
| Flavors | 0.9 |
| TiO2 | 0.2 |
| Lactic Acid | 0.7 |
| small granules/native Rice starch | 10.5 |

To prepare the dairy-based binder, the cream cheese, maltodextrin, and sugar were blended at room temperature (about 20 to about 25° C.) until homogeneous and smooth (approximately about 5 minutes.) Then, the remaining ingredients were added at room temperature to form a pumpable paste. The paste was then transferred to a bowl or dough kneader where dry ingredients are mixed in. The dry ingredients are set forth in Table 7 below.

TABLE 7

| Dry Base | |
|---|---|
| Ingredient | % |
| Baked Oat Granola | 65.0 |
| Baked Whole Oat Flakes | 23.2 |
| Flavor | 0.2 |
| Strawberry (Aw = 0.85) | 11.6 |

The oat flakes were first placed onto a baking plate and sprayed with about 15 percent water and baked in an oven at about 200° C. for about 6 minutes. The dry ingredients of Table 7 were then gently blended with the dairy binder at room temperature. The mixed dough mass when then allowed to sit at room temperature while still in the blender for about 3 hours. The equilibrated mass was then formed into about 50 gram bars using a bar mold into which the dough was pressed by hand. The formed bars were then stored chilled for about 4 days. The final bars had about 3.3 percent dairy protein, about 16 percent moisture, about 8 percent fat, a water activity of about 0.85, and a pH of 5. The final bars had a dairy protein to moisture ratio of about 0.2.

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims

What is claimed is:

1. A chewy and intermediate moisture bar using a dairy-based binder, the bar comprising:
a dry base selected from one of grains, nuts, granola, oats, and mixtures thereof;
a dairy-based binder including about 3 to about 14 percent dairy protein, about 16 to about 35 percent water, and less than about 0.1 percent non-dairy binding ingredients all based on the weight of the dairy-based binder, and a dairy protein to moisture ratio of less than about 0.5 such that the dairy-based binder includes about 2 to about 5 times more moisture than dairy protein, the dairy-based binder blended with the dry base;
about 3 to about 9 percent total dairy protein, about 10 to about 40 percent total water, and a total dairy protein to total moisture ratio of less than 0.5 such that the bar includes about 2 to about 5 times more total moisture than total dairy protein so that the dairy protein is sufficiently hydrated effective to function as a binder to form the dry base into a moist and chewy self-supporting bar shape;
wherein the maximum exposure temperature of the dairy-based binder and the chewy and intermediate moisture bar is about 110° F. and the dairy-based binder includes live and active cultures; and
wherein the dairy-based binder includes a blend of an aqueous dairy source and a dry dairy protein source.

2. The chewy and intermediate moisture bar of claim 1, wherein the dairy protein to moisture ratio of the binder and the total dairy protein to total moisture ratio of the chewy and intermediate moisture bar are both about 0.2 to about 0.5.

3. The chewy and intermediate moisture bar of claim 1, wherein the aqueous dairy source is selected from the group consisting of cheese, cream, milk, yogurt, cultured dairy products, and mixtures thereof.

4. The chewy and intermediate moisture bar of claim 1, wherein the dry dairy protein source is selected from the group consisting of non-fat dry milk, milk powders, milk protein concentrate, whey protein concentrate, cultured powders, and mixtures thereof.

5. The chewy and intermediate moisture bar of claim 1, further comprising about 40 to about 60 percent of the dairy-based binder and about 60 to about 40 percent of the dry base.

6. The chewy and intermediate moisture bar of claim 1, wherein the chewy and intermediate moisture bar has no non-dairy binding agents.

7. The chewy and intermediate moisture bar of claim 1, wherein the dry base includes about 30 to about 45 percent grains, nuts, granola, oats, or mixtures thereof and up to about 5 percent of a low or intermediate water activity fruit with a water activity less than about 0.5.

8. The chewy and intermediate moisture bar of claim 1, wherein the chewy and intermediate moisture bar has a water activity of about 0.5 to about 0.9.

9. The chewy and intermediate moisture bar of claim 8, wherein the water activity is about 0.7 to about 0.85.

10. The chewy and intermediate moisture bar of claim 1, wherein the chewy and intermediate moisture bar includes about 8 percent to about 16 percent sugar solids.

* * * * *